United States Patent
Jungwirth et al.

(10) Patent No.: US 10,151,445 B2
(45) Date of Patent: Dec. 11, 2018

(54) LIGHT ASSEMBLY HAVING LIGHT HOMOGENIZER

(71) Applicant: THE BOEING COMPANY, Chicago, IL (US)

(72) Inventors: Douglas R. Jungwirth, Porter Ranch, CA (US); Anton M. Bouckaert, Simi Valley, CA (US); David Mendez, Arieta, CA (US)

(73) Assignee: The Boeing Company, Chicago, IL (US)

( * ) Notice: Subject to any disclaimer, the term of this patent is extended or adjusted under 35 U.S.C. 154(b) by 788 days.

(21) Appl. No.: 14/201,973

(22) Filed: Mar. 10, 2014

(65) Prior Publication Data

US 2015/0252977 A1 Sep. 10, 2015

(51) Int. Cl.
*F21V 7/00* (2006.01)
*F21V 13/04* (2006.01)
(Continued)

(52) U.S. Cl.
CPC ............ *F21V 7/0091* (2013.01); *F21S 8/003* (2013.01); *F21V 13/04* (2013.01); *F21V 29/677* (2015.01);
(Continued)

(58) Field of Classification Search
CPC ........ F21S 8/003; F21V 13/04; F21V 29/677; F21V 7/0091; F21W 2131/10
(Continued)

(56) References Cited

U.S. PATENT DOCUMENTS

| 1,788,910 A | 1/1931 | Buttolph |
| 3,813,155 A | 5/1974 | Szymber |

(Continued)

FOREIGN PATENT DOCUMENTS

| EP | 0279650 | 8/1988 |
| EP | 1398659 | 3/2004 |

(Continued)

OTHER PUBLICATIONS

European Search Report for EP App No. 14198272.8, dated Jul. 6, 2015.
(Continued)

*Primary Examiner* — Anh Mai
*Assistant Examiner* — Jessica M Apenteng
(74) *Attorney, Agent, or Firm* — Joseph M. Butscher; The Small Patent Law Group, LLC

(57) ABSTRACT

A light assembly is configured to provide a uniform light pattern onto a target, and may include a housing, a light source retained within the housing, wherein the light source is configured to generate a generated light beam, and a light homogenizer retained with the housing and disposed within a light path downstream from the light source. The light homogenizer includes a main body having an input end and an output end, and is configured to receive the generated light beam at the input end. The light homogenizer is configured to homogenize the generated light beam and output homogenized light at the output end. A focusing lens may be moveably retained with the housing and disposed within the light path downstream from the light homogenizer. The focusing lens is configured to focus the homogenized light onto the target.

19 Claims, 3 Drawing Sheets

(51) Int. Cl.
  *F21S 8/00* (2006.01)
  *F21V 8/00* (2006.01)
  *F21V 29/67* (2015.01)
  *G02B 27/09* (2006.01)
  *F21W 131/10* (2006.01)
  *G02B 6/26* (2006.01)

(52) U.S. Cl.
  CPC ......... *G02B 6/0008* (2013.01); *G02B 6/0096* (2013.01); *G02B 27/0994* (2013.01); *F21W 2131/10* (2013.01); *G02B 6/262* (2013.01)

(58) Field of Classification Search
  USPC ....................................................... 362/551
  See application file for complete search history.

(56) References Cited

U.S. PATENT DOCUMENTS

| | | | | |
|---|---|---|---|---|
| 6,227,682 | B1* | 5/2001 | Li | F21V 7/0025 362/293 |
| 7,306,342 | B2* | 12/2007 | Wu | H04N 9/315 348/E9.027 |
| 7,553,045 | B2* | 6/2009 | Hung | G02B 6/0001 362/240 |
| 2004/0070738 | A1* | 4/2004 | Sekiguchi | G03B 21/208 353/102 |
| 2004/0071434 | A1 | 4/2004 | Kawaai | |
| 2004/0252281 | A1* | 12/2004 | Fischer | F21V 5/006 353/53 |
| 2006/0256295 | A1 | 11/2006 | Lang | |
| 2007/0258058 | A1* | 11/2007 | Ikeda | G02B 27/0994 353/99 |
| 2008/0036973 | A1 | 2/2008 | Kojima | |

FOREIGN PATENT DOCUMENTS

| | | |
|---|---|---|
| EP | 1584963 | 10/2005 |
| EP | 1746454 | 1/2007 |
| JP | S62-216101 | 9/1987 |
| JP | 2004-102132 | 4/2004 |
| JP | 2007-004200 | 1/2007 |
| JP | 2007-27122 | 2/2007 |
| JP | 2008-502096 | 1/2008 |
| JP | 2008-502951 | 1/2008 |
| JP | 2009-510669 | 3/2009 |
| WO | WO 2005/096096 | 10/2005 |
| WO | WO 2007/005624 | 1/2007 |
| WO | WO 2014/031641 | 2/2014 |

OTHER PUBLICATIONS

Communication for EP App No. 14198272.8, dated Feb. 28, 2017.
Communication for EP App No. 14198272.8, dated Feb. 12, 2018.
English translation of JP Office Action for JP 2014-257214, dated Sep. 3, 2018.
JP Office Action for JP 2014-257214, dated Sep. 3, 2018.
English Abstract of JP 2007-004200.

\* cited by examiner

LIGHT ASSEMBLY HAVING LIGHT HOMOGENIZER

BACKGROUND OF THE DISCLOSURE

Embodiments of the present disclosure generally relate to light assemblies, such as searchlights, flashlights, vehicle headlights, and the like, and, more particularly, to light assemblies including light homogenizers.

High-power searchlights are used in various settings to focus light energy onto a particular target. A typical searchlight includes an arc lamp that outputs light that is reflected by conic mirrors. However, typical searchlights generally provide light having a non-uniform intensity profile at the target. For example, as light is focused onto a particular target, a small donut-shaped dark spot appears on the target. As the search light is adjusted to provide a wider beam, the dark spot typically becomes larger. As such, typical searchlights may be incapable of adequately illuminating an entire surface of a target area.

One known searchlight uses a reduced portion of generated light to project a relatively uniform beam. Another known searchlight includes a spatial filter that is used to filter some of the generated light to provide an enhanced light profile at a target plane. However, by using only a portion of generated light, and/or filtering light, a portion of the total generated light is wasted. Moreover, these known searchlights typically include an increased number of optics, thereby adding time and cost to the manufacturing process, and typically do not completely eliminate dark spots within a light profile.

SUMMARY OF THE DISCLOSURE

Certain embodiments of the present disclosure provide a light assembly, such as a searchlight, that is configured to provide a uniform light pattern onto a target. The light assembly may include a housing, a light source retained within the housing, wherein the light source is configured to generate a generated light beam, and a light homogenizer retained with the housing and disposed within a light path downstream from the light source. The light homogenizer may include a main body having an input end and an output end. The light homogenizer is configured to receive the generated light beam at the input end, and homogenize the generated light beam and output homogenized light at the output end. A focusing lens may be moveably retained with the housing and disposed within the light path downstream from the light homogenizer. The focusing lens is configured to focus the homogenized light onto the target.

In at least one embodiment, the light homogenizer is formed as an optically-transparent rod having a polished surface. The light homogenizer may form the homogenized light through total internal reflection. The light homogenizer may be formed from glass or clear plastic.

In at least one embodiment, the light homogenizer includes one or more mirrors surrounding an open-ended light channel. The mirror(s) includes one or more internal reflective surfaces directed toward a longitudinal axis of the light homogenizer.

The light homogenizer may be a parallel light homogenizer. In at least one embodiment, the light homogenizer has a circular axial cross-section. Alternatively, the light homogenizer has an axial cross-section shaped as a triangle, square, pentagon, hexagon, heptagon, or octagon.

The light source may include an arc lamp. The light source directs the generated light beam into the input end of the light homogenizer through one or more conic mirrors.

Certain embodiments of the present disclosure provide a method of providing a uniform light pattern onto a target. The method may include generating a light beam with a light source retained within a housing, directing the light beam into an input end of a light homogenizer retained with the housing, homogenizing the light beam with the light homogenizer, outputting the homogenized light from an output end of the light homogenizer as a homogenized light beam, and focusing the homogenized light beam onto the target with a focusing lens that is moveably retained within the housing.

DETAILED DESCRIPTION OF THE DISCLOSURE

The foregoing summary, as well as the following detailed description of certain embodiments will be better understood when read in conjunction with the appended drawings. As used herein, an element or step recited in the singular and proceeded with the word "a" or "an" should be understood as not excluding plural of the elements or steps, unless such exclusion is explicitly stated. Further, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional elements not having that property.

Figure 1:
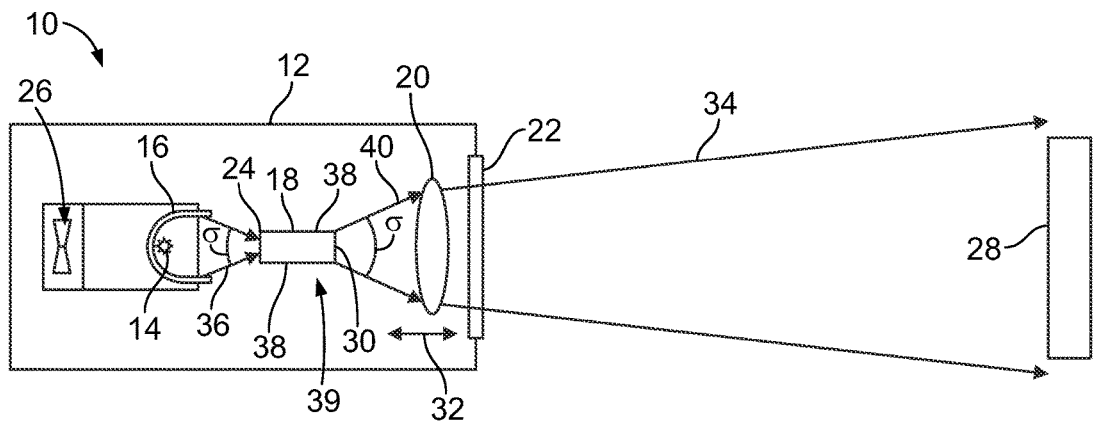
FIG. 1 illustrates a schematic diagram of a light assembly, according to an embodiment of the present disclosure.

FIG. 1 illustrates a schematic diagram of a light assembly 10, according to an embodiment of the present disclosure. The light assembly 10 includes a housing 12 that securely retains a light source 14, a reflector 16, a light homogenizer 18, a focusing lens 20, and a transparent outlet 22.

The light source 14 may be or include an arc lamp that is configured to generate white light, for example. The reflector 16 may be a conic or parabolic mirror that is configured to direct the emitted light from the arc lamp into an input end 24 of the light homogenizer 18. Additionally, the light assembly 26 may also include a fan 26 configured to circulate air flow through the light assembly 10 to dissipate any heat generated by the light source 14. The housing 12 may also include one or more vents that allow air to pass into and out of the housing. Alternatively, the light assembly 26 may not include the fan 26. For example, instead of the fan 26, the light assembly 10 may include vents that are configured to allow air to pass therethrough to cool the internal components of the light assembly 10.

Alternatively, the light source 14 may be various other types of light sources other than an arc lamp. For example, the light source may be an incandescent light bulb, a fluorescent light bulb, one or more light emitting diodes (LEDs), or the like.

The light homogenizer 18 is used to eliminate or otherwise reduce any potential dark spot that would otherwise appear on a target 28 (for example, the targeted area that is to be illuminated). The light homogenizer 18 receives light from the light source 14 that is focused into the input end 24 by the reflector 16. The light homogenizer 18 folds or otherwise reflects the light onto itself so that light that passes out of an output end 30 of the light homogenizer 18 is uniform and consistent. As such, the light that passes out of the output end 30 may be devoid of any dark spot, such as a donut-shaped dark spot produced by known searchlights, flashlights, and the like.

As shown, the light homogenizer 18 may be disposed within a light path 39 between the light source 14 and the focusing lens 20, or other such focusing optical element. The light homogenizer 18 is configured to output an intensity-redistributed uniform light beam that may be collimated by the focusing lens 20. As such, a uniform illumination pattern may be provided at the target 28.

The focusing lens 20 may be used to focus light onto a particular target, such as the target 28. The focusing lens 20 may be moved within the housing 12 in the directions of arrows 32 to adjust the width of an output light beam 34 at the target 28. For example, if the focusing lens 20 is moved toward the light homogenizer 18, the output light beam 34 may be widened. Conversely, if the focusing lens 20 is moved away from the light homogenizer 18, the output light beam 34 may be narrowed.

In operation, the light source 14 generates a generated light beam 36 that is focused by the reflector 16 into the input end 24 of the light homogenizer 18 at an angle θ. The light homogenizer 18 may include parallel reflecting surfaces 38 that ensure that the light passes through the outlet end 30 at the same angle θ. The light passes out of the light homogenizer 18 as homogenized light 40 that may then be focused on the target 28 through the focusing lens 20.

As the generated light beam 36 passes through the light homogenizer 18, the generated light beam is folded or otherwise reflected onto itself, which thereby homogenizes the light. The homogenized light 40 that passes out of the light homogenizer 18 exhibits a consistent and uniform intensity profile that may be devoid of a dark spot.

The light homogenizer 18 may be formed of a solid piece of an optically-transparent material, such as glass, clear plastic, or the like. The optically-transparent material may be formed of a material that does not absorb any portion of light that is to be output from the light assembly 10. In such an embodiment, an outer surface of the optically-transparent material may be polished and uncoated. The outer surface may be polished through various known methods in order to eliminate, minimize, or otherwise reduce any bumps, divots, protuberances, or other such imperfections. As such, as the generated light beam 36 passes into the input end 24 of the light homogenizer 18, the light is unable to propagate through the reflecting surfaces 38 and reflects back onto itself through a phenomenon of total internal reflection. As the light passes through the light homogenizer 18 and strikes the reflecting surfaces 38, the light is unable to pass through the reflecting surfaces 38 as the refractive index is lower on the outside surface of the reflecting surfaces 38 as compared to the inner surface. Consequently, the light is entirely reflected within the light homogenizer 18.

Alternatively, instead of being formed from a solid piece of optically-transparent material, the light homogenizer 18 may include a plurality of reflectors positioned about an open-ended light channel, such as an air gap, space, or the like. Both ends of the light channel are open so that light may pass into, through, and out of the light channels. The reflectors may include reflecting surfaces that face each other, or toward a longitudinal axis of the light homogenizer 18. The reflectors may be parallel with one another, and reflect the light back onto itself as it passes through the light homogenizer 18. The reflectors may connect together and define a light tunnel through which the light passes.

While the light assembly 10 is shown having various components in FIG. 1, it is to be understood that more or less components may be used. For example, the light assembly 10 may not include the focusing lens 20, the fan 26, or the reflector 16. Instead, the housing 12 may include the light source 14 that focuses generated light into the input end 24 of the light homogenizer 18, which then acts to output the homogenized light 40 out of the housing 12 onto the target 28.

The focusing lens 20 may act as a collimator. Optionally, the light assembly 10 may also include a collimator in addition to, or instead of, the focusing lens 20. The collimator is configured to produce a beam of parallel light rays, for example.

Figure 2:
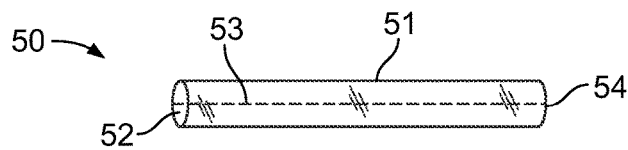
FIG. 2 illustrates a perspective side view of a light homogenizer, according to an embodiment of the present disclosure.

FIG. 2 illustrates a perspective side view of a light homogenizer 50, according to an embodiment of the present disclosure. The light homogenizer 50 is an example of the light homogenizer 18, shown in FIG. 1. The light homogenizer 50 may be formed of an optically-transparent material, such as glass, clear plastic, or the like, and includes a main body 51 formed of parallel reflecting surfaces between an input end 52 and an output end 54. As shown, the light homogenizer 50 may be a clear cylindrical tube having a circular axial cross-section. The outer surface of the main body 51 may be polished to a smooth, consistent finish that is devoid of bumps, scratches, divots, protuberances, dents, or other such imperfections. Accordingly, the light homogenizer 50 may be configured to homogenize light through total internal reflection.

The polished outer surface of the main body 51 is configured to continually reflect a light beam back onto itself as the light beam propagates along a longitudinal axis 53 of the light homogenizer 50. The polished outer surface may provide a mirror coating, for example.

Figure 3:
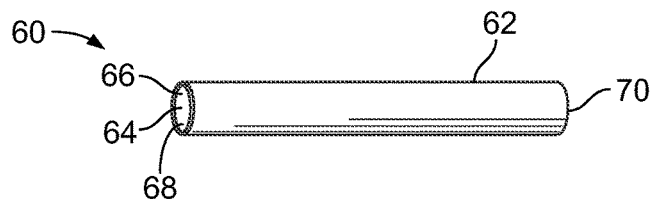
FIG. 3 illustrates a perspective side view of a light homogenizer, according to an embodiment of the present disclosure.

FIG. 3 illustrates a perspective side view of a light homogenizer 60, according to an embodiment of the present disclosure. The light homogenizer 60 is an example of the light homogenizer 18, shown in FIG. 1. The light homogenizer 60 may be formed as a hollow cylindrical tube having a cylindrical wall 62 that surrounds an internal air space, gap, or void, that defines a light channel 64. The cylindrical wall 62 may include an internal reflective surface 66 that may include a one or more mirrors. For example, the internal reflective surface 66 may include a plurality of parallel mirrors that extend from an input end 68 to an output end 70. Alternatively, a single, flexible mirror may be rolled into a cylinder, as shown. The reflective surface 66 formed by one or more mirrors wraps entirely around the light channel 64 so that light may not pass through any gap formed through the cylindrical wall 64. That is, the cylindrical wall 64 may be devoid of any gaps within the internal reflective surface 66. The internal reflective surface 66 is configured to reflect light back onto itself so that the light passes out of the output end 70 as homogenized light.

Figure 4:
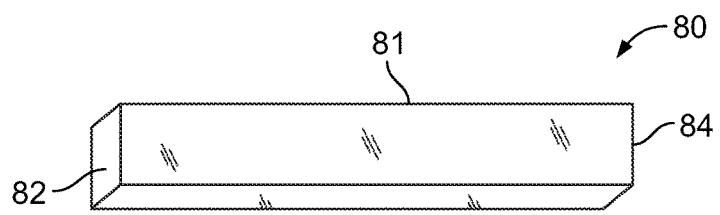
FIG. 4 illustrates a perspective side view of a light homogenizer, according to an embodiment of the present disclosure.

FIG. 4 illustrates a perspective side view of a light homogenizer 80, according to an embodiment of the present disclosure. The light homogenizer 80 is an example of the light homogenizer 18, shown in FIG. 1. The light homogenizer 80 may be formed of an optically-transparent material, such as glass, clear plastic, or the like, and includes a main body 81 formed of parallel reflecting surfaces between an input end 82 and an output end 84. As shown, the light homogenizer 80 may be a clear rectangular rod having a square-shaped axial cross-section. The outer surface of the main body 81 may be polished to a smooth, consistent finish that is devoid of bumps, scratches, divots, protuberances, dents, or other such imperfections. Accordingly, the light homogenizer 80 may be configured to homogenize light through total internal reflection.

Figure 5:
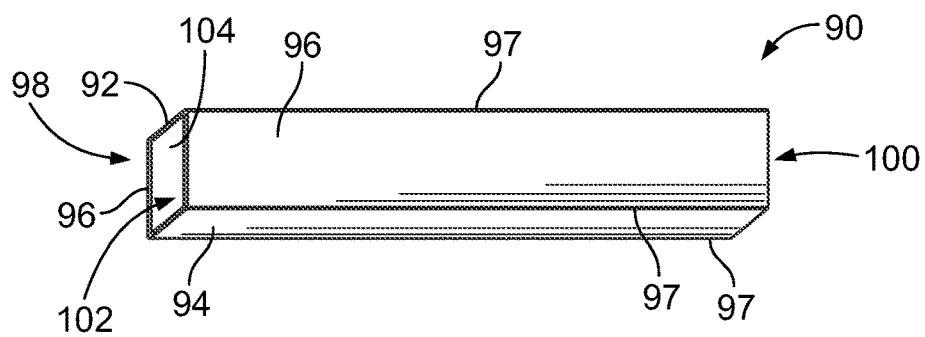
FIG. 5 illustrates a perspective side view of a light homogenizer, according to an embodiment of the present disclosure.

FIG. 5 illustrates a perspective side view of a light homogenizer 90, according to an embodiment of the present disclosure. The light homogenizer 90 is an example of the light homogenizer 18, shown in FIG. 1. The light homogenizer 90 may be formed as a hollow rectangular member having a top wall 92 integrally connected to a bottom wall 94 through lateral walls 96. As shown, the walls 92, 94, and 96 connect to one another at interesting lines 97, which may be parallel to one another. The walls 92, 94, and 96 may be parallel with one another from an input end 98 to an output end 100. The walls 92, 94 and 96 surround an internal air space, gap, or void, that defines a light channel 102. Each of the walls 92, 94, and 96 may include an internal reflective surface 104, such as a mirror. For example, the internal reflective surface 104 of each of the walls 92, 94, and 96 may include a mirror that that extends from the input end 98 to the output end 100. The reflective surfaces 104 formed by the mirrors combine to extend entirely around the light channel 102 so that light may not pass through any gap formed through the walls 92, 94, and 96. That is, the light homogenizer 90 may be devoid of any gaps within the internal reflective surface 104. The internal reflective surfaces 104 are configured to reflect light back onto itself so that the light passes out of the output end 100 as homogenized light.

Figure 6:
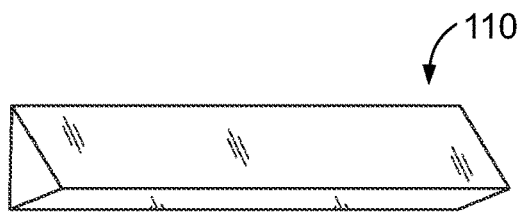
FIG. 6 illustrates a perspective side view of a light homogenizer, according to an embodiment of the present disclosure.

FIG. 6 illustrates a perspective side view of a light homogenizer 110, according to an embodiment of the present disclosure. The light homogenizer 110 is an example of the light homogenizer 18, shown in FIG. 1. The light homogenizer 110 is similar to the light homogenizer 80 shown in FIG. 4, except that the axial cross-section of the light homogenizer 110 is triangular.

Figure 7:
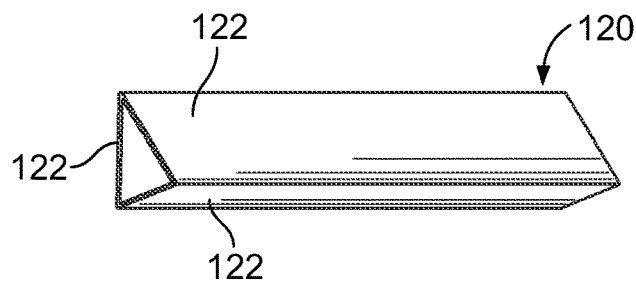
FIG. 7 illustrates a perspective side view of a light homogenizer, according to an embodiment of the present disclosure.

FIG. 7 illustrates a perspective side view of a light homogenizer 120, according to an embodiment of the present disclosure. The light homogenizer 120 is an example, of the light homogenizer 18, shown in FIG. 1. The light homogenizer 120 is similar to the light homogenizer 90 shown in FIG. 5, except that the axial cross-section of the shape defined by the walls 122 of the light homogenizer 120 is triangular.

Figure 8:
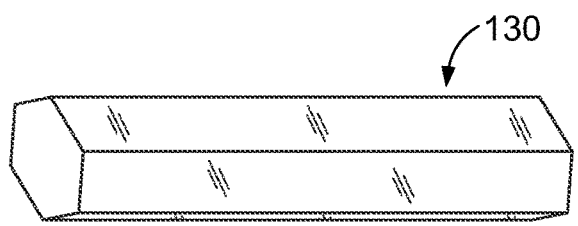
FIG. 8 illustrates a perspective side view of a light homogenizer, according to an embodiment of the present disclosure.

FIG. 8 illustrates a perspective side view of a light homogenizer 130, according to an embodiment of the present disclosure. The light homogenizer 130 is an example of the light homogenizer 18, shown in FIG. 1. The light homogenizer 130 is similar to the light homogenizer 80 shown in FIG. 4, except that the axial cross-section of the light homogenizer 130 is hexagonal. Various other polygonal shapes may be used. For example, the light homogenizer 130 may be formed as a pentagonal, heptagonal, octagonal, etc. rod of optically-transparent material.

Figure 9:
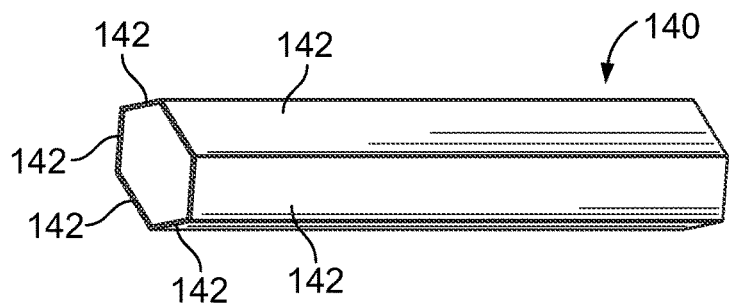
FIG. 9 illustrates a perspective side view of a light homogenizer, according to an embodiment of the present disclosure.

FIG. 9 illustrates a perspective side view of a light homogenizer 140, according to an embodiment of the present disclosure. The light homogenizer 140 is an example, of the light homogenizer 18, shown in FIG. 1. The light homogenizer 140 is similar to the light homogenizer 90 shown in FIG. 5, except that the axial cross-section of the shape defined by the walls 142 of the light homogenizer 140 is hexagonal. Various other polygonal shapes may be used. For example, the axial cross-section of the shape defined by the walls 142 of the light homogenizer 140 may be pentagonal, heptagonal, octagonal, etc.

Referring to FIGS. 1-9, the light homogenizers may be parallel light homogenizers. For example, the reflecting surfaces of the light homogenizers may be parallel to one another and to a longitudinal axis of the light homogenizer. Alternatively, the light assemblies may include tapered light homogenizers. For example, a conical light homogenizer having an input end having a greater diameter than that of an output end may be used.

It is to be understood that any of the light homogenizers disclosed in the present application may include any number of sides. FIGS. 2-9 merely provide some examples of light homogenizers.

Figure 10:
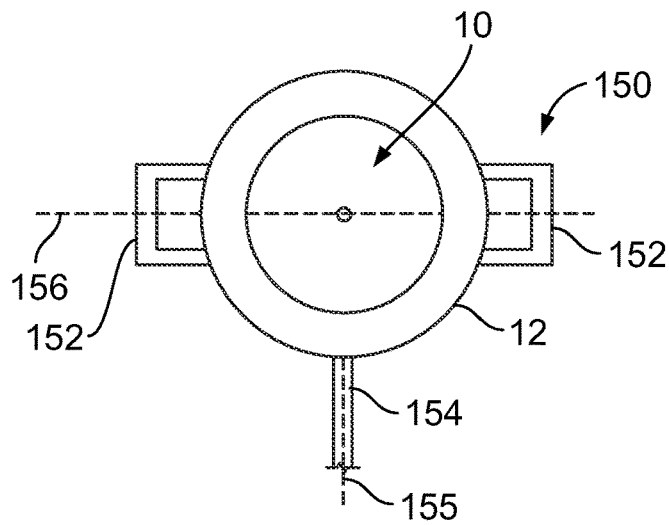
FIG. 10 illustrates a front view of a light assembly, according to an embodiment of the present disclosure.

FIG. 10 illustrates a front view of a light assembly 150, according to an embodiment of the present disclosure. The light assembly 150 may include the light assembly 10, shown in FIG. 1, and may include handles 152 configured to be grasped by an individual. The light assembly 150 may include a housing 12 mounted on a post 154, for example. The housing 12 may be configured to rotate about a vertical axis 155 of the post 154. Further, the housing 12 may be configured to rotate about a horizontal axis 156. As shown, the light assembly 150 may be a searchlight.

Figure 11:
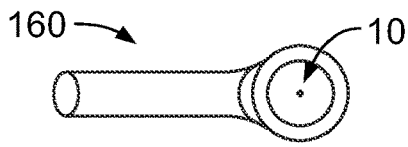
FIG. 11 illustrates a side view of a light assembly, according to an embodiment of the present disclosure.

FIG. 11 illustrates a side view of a light assembly 160, according to an embodiment of the present disclosure. The light assembly 160 may include a graspable handle connected to the light assembly 10, shown in FIG. 1. The light assembly may be a flashlight.

Figure 12:
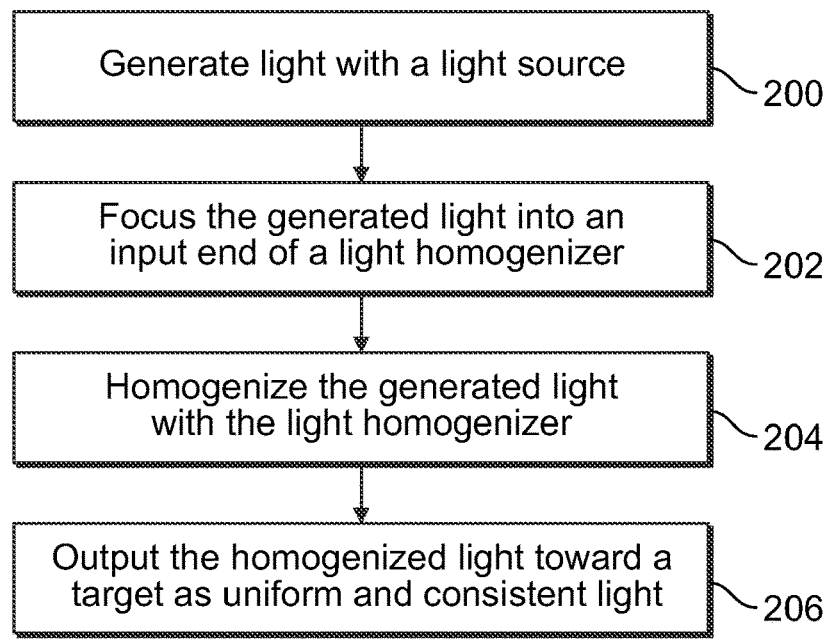
FIG. 12 illustrates a flow chart of a method of providing uniform and consistent light on a target, according to an embodiment of the present disclosure.

FIG. 12 illustrates a flow chart of a method of providing uniform and consistent light on a target, according to an embodiment of the present disclosure. At 200, light is generated with a light source, such as an arc lamp. Next, at 202, the generated light is focused into an input end of a light homogenizer. For example, the generated light may be focused into the input end through a conical or parabolic reflector that surrounds the light source. Next, at 204, the light homogenizer homogenizes the generated light, such as by folding or otherwise reflecting the light back onto itself as the light passes through the light homogenizer. For example, the light homogenizer may homogenize the light through total internal reflection. After the light has been homogenized, the homogenized light is output through the output end of the light homogenizer toward a target as uniform and consistent light that may be devoid of any dark spots or darkened areas.

Embodiments of the present disclosure may be used with various types of light assemblies other than those shown. For example, embodiments of the present disclosure may be used with headlights of vehicles, aircraft landing lights, indoor lighting configured to be used with rooms of buildings, and the like.

Embodiments of the present disclosure provide light assemblies that include light homogenizers that output light having a uniform intensity profile that may be devoid of any dark spots. Embodiments of the present disclosure eliminate, minimize, or otherwise reduce dark spots within light emitted by a light assembly. Accordingly, embodiments of the present disclosure are able to uniformly illuminate a target area.

Embodiments of the present disclosure provide a light homogenizer within an optical system. The light homogenizer provides a uniform beam profile that may be output to a target plane.

Certain embodiments of the present disclosure provide a method for enhancing illumination of a searchlight that may include incorporating a light homogenizer in a light path between a light source and a focusing optical element in the search light. The method may also include outputting an intensity-redistributed uniform light beam that may be collimated by a focusing optical element. As such, a uniform illumination pattern may be provided on a target.

Certain embodiments of the present disclosure provide a light homogenizer that may include three or more mirrors having lines of intersection that are parallel to one another. Certain embodiments of the present disclosure provide a light homogenizer that may include polished outer surfaces that are configured to continually reflect a light beam back onto itself as the light beam propagates along a longitudinal axis of the light homogenizer. The polished outer surface may provide a mirror coating.

While various spatial and directional terms, such as top, bottom, lower, mid, lateral, horizontal, vertical, front and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments of the disclosure without departing from their scope. While the dimensions and types of materials described herein are intended to define the parameters of the various embodiments of the disclosure, the embodiments are by no means limiting and are exemplary embodiments. Many other embodiments will be apparent to those of skill in the art upon reviewing the above description. The scope of the various embodiments of the disclosure should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various embodiments of the disclosure, including the best mode, and also to enable any person skilled in the art to practice the various embodiments of the disclosure, including making and using any devices or systems and performing any incorporated methods. The patentable scope of the various embodiments of the disclosure is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal languages of the claims.

What is claimed is:

1. A light assembly configured to provide a uniform light pattern onto a target, the light assembly comprising:
   a housing;
   a light source retained within the housing, wherein the light source is configured to generate a generated light beam;
   a light homogenizer retained with the housing and disposed within a light path downstream from the light source, wherein the light homogenizer includes a main body having an input end and an output end and a single, flexible mirror surrounding an open-ended light channel, wherein the single, flexible mirror includes an internal reflective surface that wraps entirely around a length of the open-ended light channel, wherein the light homogenizer is configured to receive the generated light beam at the input end, and wherein the light homogenizer is configured to homogenize the generated light beam and output homogenized light at the output end; and
   a focusing lens moveably retained with the housing and disposed within the light path downstream from the light homogenizer, wherein the focusing lens is configured to focus the homogenized light onto the target.

2. The light assembly of claim 1, wherein the main body of the light homogenizer is formed as an optically-transparent rod having a polished surface, wherein the light homogenizer forms the homogenized light through total internal reflection.

3. The light assembly of claim 1, wherein the main body of the light homogenizer is formed from one of glass or clear plastic.

4. The light assembly of claim 1, wherein the internal reflective surface is directed toward a longitudinal axis of the light homogenizer.

5. The light assembly of claim 1, wherein the light homogenizer is a parallel light homogenizer.

6. The light assembly of claim 1, wherein the light homogenizer has a circular axial cross-section, wherein the single, flexible mirror is rolled into a cylinder.

7. The light assembly of claim 1, wherein the light homogenizer has an axial cross-section shaped as a triangle, square, pentagon, hexagon, heptagon, or octagon.

8. The light assembly of claim 1, wherein the light source includes an arc lamp, and wherein the light source directs the generated light beam into the input end of the light homogenizer through one or more conic mirrors.

9. The light assembly of claim 1, wherein the light assembly is a searchlight.

10. A method of providing a uniform light pattern onto a target, the method comprising:
forming a light homogenizer with a single, flexible mirror surrounding an open-ended light channel, wherein the single, flexible mirror includes an internal reflective surface that wraps entirely around a length of the open-ended light channel;
generating a light beam with a light source retained within a housing;
directing the light beam into an input end of the light homogenizer retained with the housing;
homogenizing the light beam with the light homogenizer;
outputting the homogenized light from an output end of the light homogenizer as a homogenized light beam; and
focusing the homogenized light beam onto the target with a focusing lens that is moveably retained within the housing.

11. The method of claim 10, further comprising:
forming a portion of the light homogenizer as an optically-transparent rod; and
polishing an outer surface of the optically-transparent rod, wherein the homogenizing operation comprises forming the homogenized light through total internal reflection.

12. The method of claim 10, further comprising forming a portion of the light homogenizer from one of glass or clear plastic.

13. The method of claim 10, wherein the internal reflective surface is directed toward a longitudinal axis of the light homogenizer.

14. The method of claim 10, further comprising forming the light homogenizer as a parallel light homogenizer.

15. The method of claim 10, further comprising forming the light homogenizer with a circular axial cross-section, wherein the forming the light homogenizer further comprises rolling the single, flexible mirror into a cylinder.

16. The method of claim 10, further comprising forming the light homogenizer with an axial cross-section shaped as a triangle, square, pentagon, hexagon, heptagon, or octagon.

17. The method of claim 10, wherein the generating operation comprises directing the generated light beam into the input end of the light homogenizer through one or more conic mirrors.

18. A searchlight configured to provide a uniform light pattern onto a target, the search light comprising:
a housing;
a light source retained within the housing, wherein the light source is configured to generate a generated light beam, wherein the light source includes an arc lamp, and wherein the light source directs the generated light beam into the input end of the light homogenizer through one or more conic mirrors;
a fan retained with the housing, wherein the fan is configured to dissipate heat generated by the light source within the housing;
a parallel light homogenizer retained with the housing and disposed within a light path downstream from the light source, wherein the parallel light homogenizer includes a main body having an input end and an output end and a single, flexible mirror surrounding an open-ended light channel, wherein the single, flexible mirror includes an internal reflective surface that wraps entirely around a length of the open-ended light channel, wherein the parallel light homogenizer is configured to receive the generated light beam at the input end, and wherein the parallel light homogenizer is configured to homogenize the generated light beam and output homogenized light at the output end; and
a focusing lens moveably retained with the housing and disposed within the light path downstream from the parallel light homogenizer, wherein the focusing lens is configured to focus the homogenized light onto the target.

19. The searchlight of claim 18, wherein the internal reflective surface is directed toward a longitudinal axis of the light homogenizer.

* * * * *